United States Patent
Kidushim et al.

(10) Patent No.: US 6,390,424 B1
(45) Date of Patent: May 21, 2002

(54) ACCESSORY SUPPORT DEVICE AND METHOD

(76) Inventors: Margo Kidushim; Ralph M. Kidushim, both of 4313 Chevy Chase Dr., LaCanada, CA (US) 91011

( * ) Notice: Subject to any disclaimer, the term of this patent is extended or adjusted under 35 U.S.C. 154(b) by 0 days.

(21) Appl. No.: 09/615,407

(22) Filed: Jul. 13, 2000

(51) Int. Cl.$^7$ .............................. A47F 5/00; F26B 19/00
(52) U.S. Cl. ........................... 248/122.1; 248/125.9; 248/404; 34/90; 34/97; 403/55
(58) Field of Search .................. 248/122.1, 161, 248/121, 124.2, 125.1, 125.3, 415, 157, 185.1, 186.1, 176.3, 125.9, 131, 149, 205.5, 206.2, 911, 407, 229.2, 229.4, 230.1, 230.5, 231.61, 105; 403/55, 59; 34/90, 97, 91

(56) References Cited

U.S. PATENT DOCUMENTS

| | | | | |
|---|---|---|---|---|
| 1,084,966 A | * | 1/1914 | Rodes ........................ 248/404 |
| 1,284,010 A | * | 11/1918 | Wilbur ....................... 248/103 |
| 1,375,888 A | * | 4/1921 | Baer ........................... 403/55 |
| 1,609,246 A | * | 11/1926 | Hamburger ................. 47/39 |
| 2,060,171 A | * | 11/1936 | Burton ....................... 403/53 |
| 2,349,054 A | * | 5/1944 | Phipps ....................... 248/106 |
| 2,557,430 A | * | 6/1951 | Hensley et al. ............ 248/103 |
| 2,767,003 A | * | 10/1956 | Gilmont ..................... 403/385 |
| 3,031,215 A | * | 4/1962 | Vance ........................ 403/59 |
| 3,533,583 A | * | 10/1970 | Azim ......................... 248/125.2 |
| 3,770,236 A | * | 11/1973 | Marsh et al. ............... 248/408 |
| 3,964,708 A | | 6/1976 | Reeves ...................... 248/126 |
| 3,979,096 A | | 9/1976 | Zieger ....................... 248/75 |
| 4,136,848 A | | 1/1979 | McCollum ................. 248/316 R |
| D253,305 S | | 10/1979 | Battaglia .................... D28/17 |
| 4,219,178 A | | 8/1980 | Assion ....................... 248/314 |
| 4,225,106 A | | 9/1980 | Eplan ........................ 248/309 |
| 4,251,043 A | * | 2/1981 | Horner ...................... 248/117.6 |
| 4,278,223 A | | 7/1981 | Fauteux ..................... 248/125 |
| D261,818 S | | 11/1981 | Galuppo .................... D28/73 |
| 4,323,212 A | | 4/1982 | Macaulay ................... 248/51 |
| 4,339,104 A | * | 7/1982 | Weidman ................... 248/407 |
| 4,453,695 A | | 6/1984 | Sennott et al. ............. 248/660 |
| 4,461,439 A | | 7/1984 | Rose .......................... 248/51 |
| 4,673,148 A | | 6/1987 | Oliver ........................ 248/293 |
| 4,696,447 A | | 9/1987 | Strecker .................... 248/206.3 |
| 4,712,313 A | | 12/1987 | Gettleman .................. 34/97 |
| 4,744,149 A | * | 5/1988 | Perna ........................ 33/27.03 |
| 4,746,090 A | | 5/1988 | Hamilton ................... 248/314 |
| 4,874,142 A | | 10/1989 | Gelatt ........................ 248/185 |
| D313,341 S | | 1/1991 | Gaboriault et al. ........ D8/366 |
| D314,502 S | | 2/1991 | Weldin ...................... D8/373 |
| 5,064,154 A | | 11/1991 | Payne ........................ 248/121 |
| 5,094,415 A | * | 3/1992 | Revette et al. ............. 248/133 |
| 5,135,189 A | | 8/1992 | Ghazizadeh ................ 248/104 |
| 5,172,880 A | | 12/1992 | McDougall ................. 248/185 |
| D342,343 S | | 12/1993 | Slivko ....................... D28/18 |
| 5,275,364 A | * | 1/1994 | Burger et al. .............. 248/122 |
| 5,279,048 A | | 1/1994 | Lawall et al. .............. 34/90 |
| 5,350,144 A | | 9/1994 | Lary .......................... 248/183 |
| 5,359,461 A | * | 10/1994 | Rice et al. ................. 359/874 |
| 5,613,305 A | * | 3/1997 | Narrin ....................... 34/90 |
| 5,636,815 A | * | 6/1997 | Wilson ...................... 248/125.9 |
| 5,640,781 A | * | 6/1997 | Carson ...................... 34/97 |
| 5,832,624 A | * | 11/1998 | Narrin ....................... 34/97 |
| 5,842,670 A | | 12/1998 | Nigoghosian ............... 248/160 |
| 5,937,537 A | * | 8/1999 | Miller ........................ 34/97 |
| 5,956,861 A | | 9/1999 | Barnes ....................... 34/90 |
| 6,061,923 A | * | 5/2000 | Case .......................... 34/90 |

* cited by examiner

Primary Examiner—Anita King (57) ABSTRACT

An accessory holder that can support an item in an infinite number of positions and orientations has advantages, especially in supporting a hair drier. The device includes a substantially longitudinal base member and a support device that enables securing the base member to a structure. A positioning support is included that is adapted to receive the base member. This enables both linear and rotary movement about the base member. A substantially longitudinal secondary member is received by the positioning support that enables linear movement or linear rotary movement thereon. An open ended mounting clamp is pivotally attached to the distal end of the secondary member. The clamp allows the user to easily secure an item, such as the handle of a hair dryer, and position the dryer in a desired location by movement of the secondary member with respect to the base member. The user can then keep the item in place while having both hands free.

19 Claims, 7 Drawing Sheets

ACCESSORY SUPPORT DEVICE AND METHOD

BACKGROUND OF THE INVENTION

The invention herein relates to a device for supporting an item and more particularly to a device for supporting a personal hand held item such as a hair dryer.

Hands free support of items such as hair dryers is desirable in that the user's hands are then free to perform other tasks, such as styling their hair. Since most individuals cannot afford to hire someone to style their hair every day, a highly adjustable yet simple, and therefore inexpensive device is desired.

Many attempts have been made to provide a mechanical device that supports the dryer. Many of these are only slightly less complex and cumbersome than growing a third arm. The more simplistic approaches often limit the adjustability for the height of the user from children to tall adults. Others only function on specific type mountings such as on a wall. While this may work for some, many do not want a fixture mounted to their wall that is only used for 5–10 minutes each day.

Previous disclosures have been made with a dryer support that uses a receiver for the barrel of the dryer. Though usually insulated, this portion of the dryer is where the heating elements are and as a result still gets hot in many dryers. Supporting a heated device near the source of the beat is potentially dangerous regarding the risk of fire.

Handle type supports are attempted in some, but here the device usually includes a strap that wraps around the handle. This only secures the dryer when the strap is extremely tight and only if the strap has sufficient width in order to overcome the moment caused by the user in the movement of the dryer into the proper position. This movement can loosen the dryer, which will cause it to sit in an awkward position or potentially fall from the support device. In addition, in most dryers the switches that control the heat, airflow and power are positioned on the front of the handle. If the strap wraps around the handle, this would potentially obstruct these switches from the user. This would cause the user to remove the dryer from the device each time they wanted to change a setting.

Similar disadvantages occur in supporting other items. The hair dryer is one of the most commonly used on a regular basis and is therefore the basis of this disclosure. What is desired is a support that is easily and widely adjustable, simple in construction in that it is inexpensive to manufacture and includes a fastening device for rapid attachment and detachment of a wide variety of models of dryer handles.

SUMMARY OF THE INVENTION

Present Invention:

In one aspect, the invention features an accessory holder comprising with a substantially longitudinal base member. A support device is used to secure the base member to a structure. A positioning support, that has been adapted to receive the base member and that enables both linear and rotary movement is used on the base member. A substantially longitudinal secondary member, which is also received by the positioning support, enables linear movement or linear and rotary movement of the secondary member. A mounting clamp is pivotally attached to the secondary member, preferably to the distal end thereof. The mounting clamp preferably includes an open end that enables an item, such as a hair dryer, mirror, flashlight or any of a variety of hand tools, to be easily placed therein and removed when the desired task is completed. The base member can be rigidly attached to a supportive structure or releasably supported by use of a suction cup on the distal end of the base member.

The system may also include a variety of locking devices to secure the base member and the secondary member in a variety of positions by use of the positioning support. This can be done by a set of split collars with threaded locking pins or sliding sleeves with notches or locking teeth in the members and a variety of pins.

In another aspects, the invention includes a method of supporting an item including providing the structure as previously disclosed and adjusting the previously mentioned mounting clamp into a desired position by movement provided by the positioning support. This allows the positioning the item in the mounting clamp, thereby allowing support of the item.

Definition of Terms:

Unless otherwise defined, all technical and scientific terms used herein have the same intended meaning as would be commonly understood by anyone of ordinary skill in the art to which this invention belongs.

DETAILED DESCRIPTION OF THE PREFERRED EMBODIMENT

Figure 1:
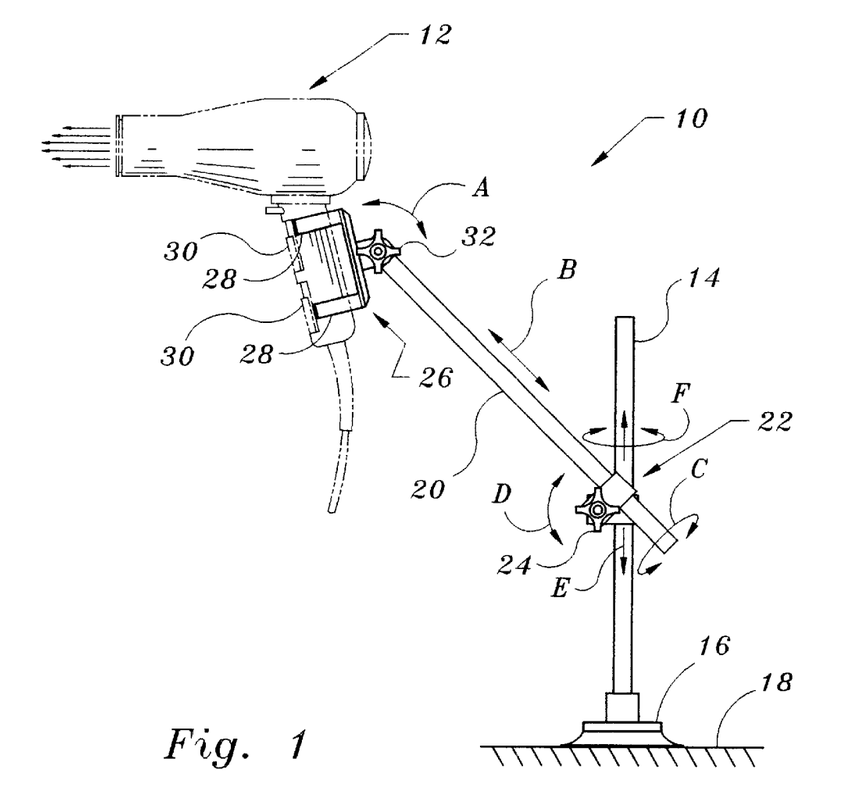
FIG. 1 is a side view of an accessory support device with a hair dryer, the device produced in accordance with a preferred embodiment of the present invention.

The object of the disclosed invention is to provide an improved device and method of supporting items in a hands free mode such that the user can perform other tasks with their hands. In the preferred embodiment of the invention, this device is used to support a "hand held" hair dryer, so that the user can have both hands free to style their hair. What is shown in FIG. 1 is a side view of an accessory support device 10 with a dryer 12 secured thereto. The dryer 12 is shown in phantom lines in that it is not part of the invention. This view shows the preferred embodiment of the invention with a base member 14 that is attached to a support device 16 in this case a suction cup. This support device 16 allows attachment to any support structure 18 such as a counter top, wall mirror, or wall. A secondary member 20 is positioned with respect to the base member 14 by use of a positioning support 22. Both the base member 14 and the secondary member 20 are received by the positioning support 22 and secured thereto by the lower screw pins 24. On the distal end of the secondary member 20 is a mounting clamp 26 is pivotally mounted. The mounting clamp 26 includes a pair of spring clamps 28. These spring clamps 28 are open on one side to receive the handle of the dryer 12 while not obstructing the switches 30. One spring clamp 28 would be functional in some instances, also dependant upon the width of the spring clamp 28. It is the consensus of the inventors that this arrangement consisting of two spring clamps 28, spaced approximately 3 inches apart (along the length of the handle), is preferred. This enables a wide variety of handle sizes and shapes to be secured within the mounting clamp 26. The spring clamps 28 are, as the name implies, preferably manufactured in the form of a spring. Suitable materials include steel, composite materials and any number of thermoplastics and thermoset plastics that offer sufficient material memory and a suitable modulus of elasticity to act as a spring.

The adjustability is further shown in the degrees of freedom that this form of the invention enables. These are shown as degrees of freedom "A–F". Degree of freedom "A" is the angular adjustment of the clamp 26 on the end of the secondary member 20. This adjustment provides movement of the dryer 12 with respect to the horizontal. This adjustment is made and secured by use of the upper screw pin 32.

Degree of freedom "B" is the linear adjustment of the secondary member 20, and the dryer 12 attached thereto, through the positioning support 22. This movement is made and secured by one of the lower screw pins 24. In this embodiment the secondary member 20 is cylindrical in shape, thus the member 20 and the dryer 12 can be rotated annularly as shown by degree of freedom "C". A third adjustment can be made from this lower screw pin 24. That is the angular positioning of the secondary member 20 with respect to the base member 14. This is designated by the degree of freedom "D".

Two additional adjustments can be made by the movement of the secondary member 20, and associated dryer 12, with respect to the base member 14. The first is in the vertical adjustment of the assembly along the length of the base member 14. This is designated by degree of freedom "E". As with the secondary member 20, the base member 14 is shown here to be cylindrical in shape. As such, the assembly can be rotated about the long axis of the base member 14. This is illustrated by degree of freedom "F". The means of providing adjustment and securing it are made by the respective loosening and tightening of a second lower screw pin (not shown).

Figure 2:
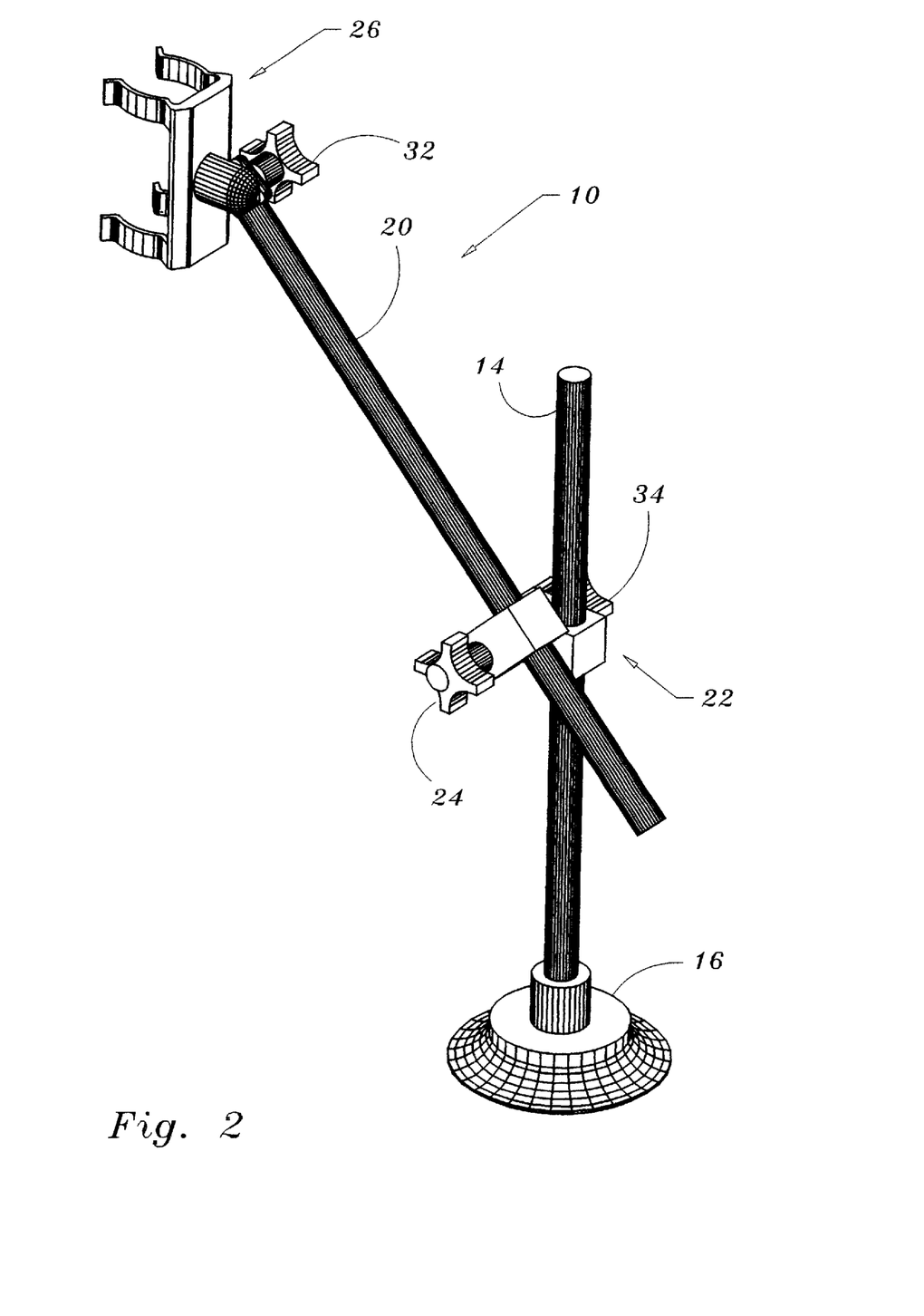
FIG. 2 is a rear isometric view of an accessory support device, the device produced in accordance with a preferred embodiment of the present invention.

An isometric view of the invention 10 is shown in FIG. 2. The base member 14 is mounted on the support device 16, or the suction cup which secures the device to the supportive surface. The positioning support 22 joins the base member 14 with the secondary member 20 which in turn positions the clamp 26 at a given position and orientation in space. The upper screw pin 32 (with a knob for the user's had to grasp) is shown at the distal end of the secondary member 20. In a similar manner the lower screw pins 24 and 34 provide a practical method of locking and unlocking mating parts. A variety of methods of attachment can be used to secure these parts in such a way that they can also be released and moved. What is shown is the preferred embodiment.

Figure 3:
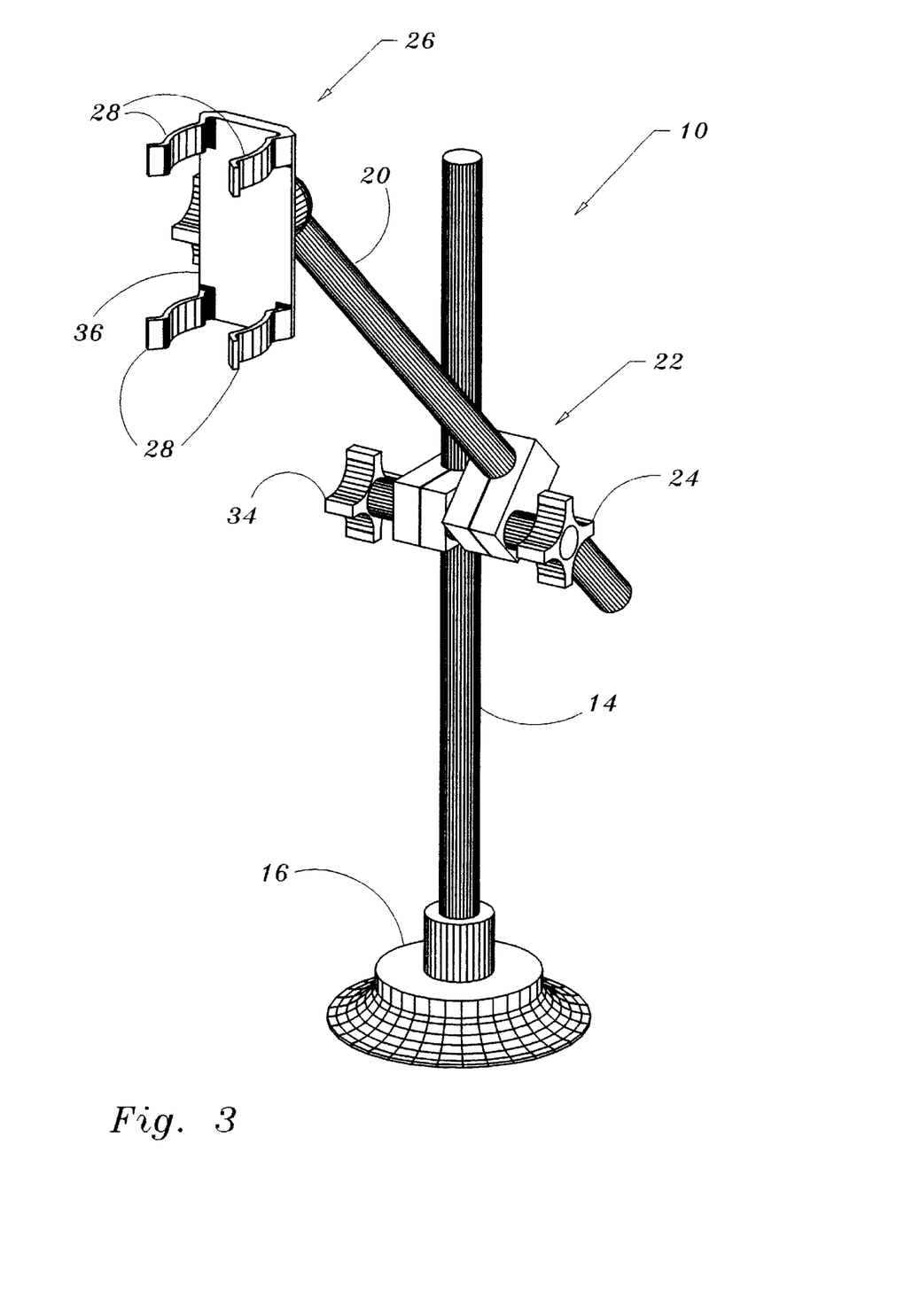
FIG. 3 is a front isometric view of an accessory support device, the device produced in accordance with a preferred embodiment of the present invention.

In FIG. 3 a front isometric view of the invention 10 is shown. In this view the spring clamps 28 are shown in more detail. Here the spring clamps 28 are molded into the base 36 of the mounting clamp 26. This is one manufactured method but the part could be comprised of spring clamps that are fastened to the base 36 of the mounting clamp 26. In any form, the spring clamps 28 are spring like in nature with an open end away from the base 36. This is done so that the spring clamps 28 can flex to receive the handle of a dryer or other object. Upon receiving the object, the spring clamps 28 grasp the object to hold it securely until the user would remove it.

Figure 4:
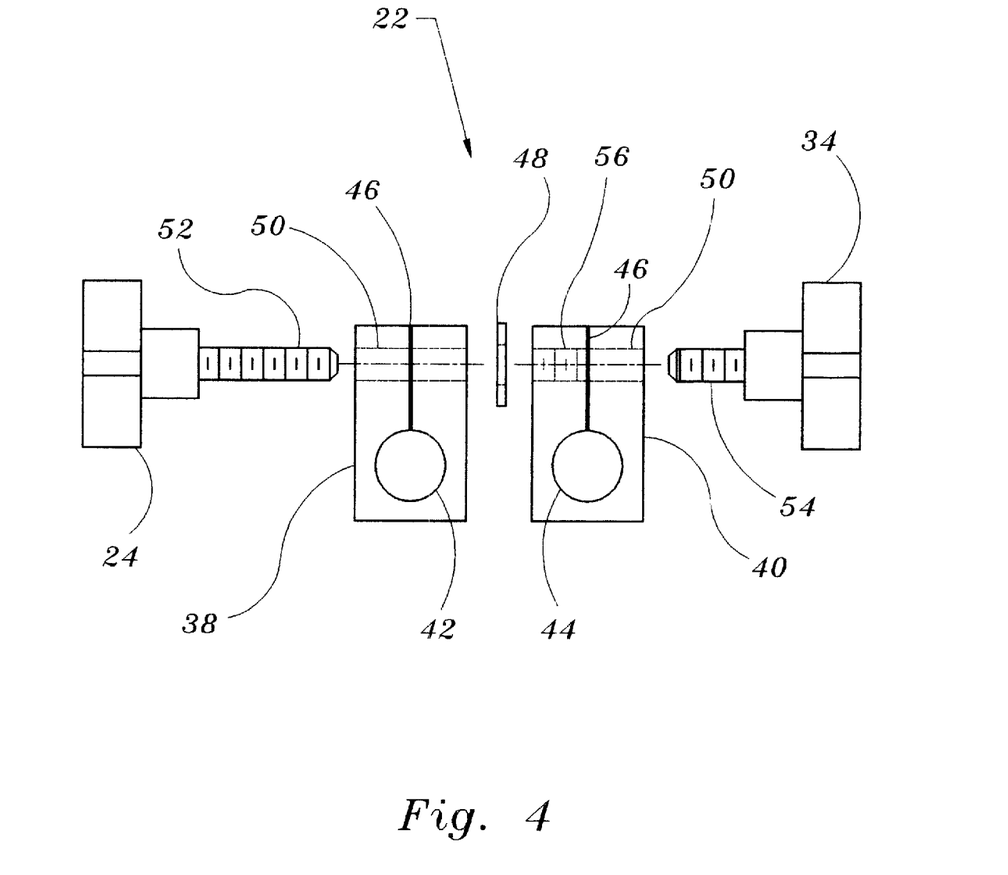
FIG. 4 is a plan view of a positioning support assembly, the assembly produced in accordance with the preferred embodiment of the present invention.

A more detailed view of the positioning support 22 is shown in FIG. 4. This is an exploded view of the components of the device. A pair of split collars 38 and 40, which are each comprised of a block of semi-rigid material with a large bore. The first large bore 42 is for receipt of the secondary member 20 and the second large bore 44 is for receipt of the base member 14. The blocks have a split 46 from the respective bores 42 and 44 through the blocks. A spacer 48 is optimally positioned between the collars to provide a bearing surface for the collars to the rotated one against the other. The collars 38 and 40 include cross-bores 50 that receive the shaft portions 52 and 54 of lower screw pins 24 and 34 respectively. One collar (here collar 40) has an internal threaded portion that mates with the male threaded portions of the shafts portions 52 and 54. By tightening the first lower screw pin 24 the split 46 is reduced and the first large bore 42 is slightly reduced, thereby clamping onto the secondary member 20 housed therein (not shown here). In addition this collar 38 is pulled against the spacer 48 and therefore the second collar 40 allowing friction to secure the collars in angular orientation with one another. The clamping mechanism of the second collar 40 works the same as the first with the threaded portion of the shaft 54 mating with the female thread 56. This secures the collar 40 to the base member 14 (not shown here).

Figure 5:
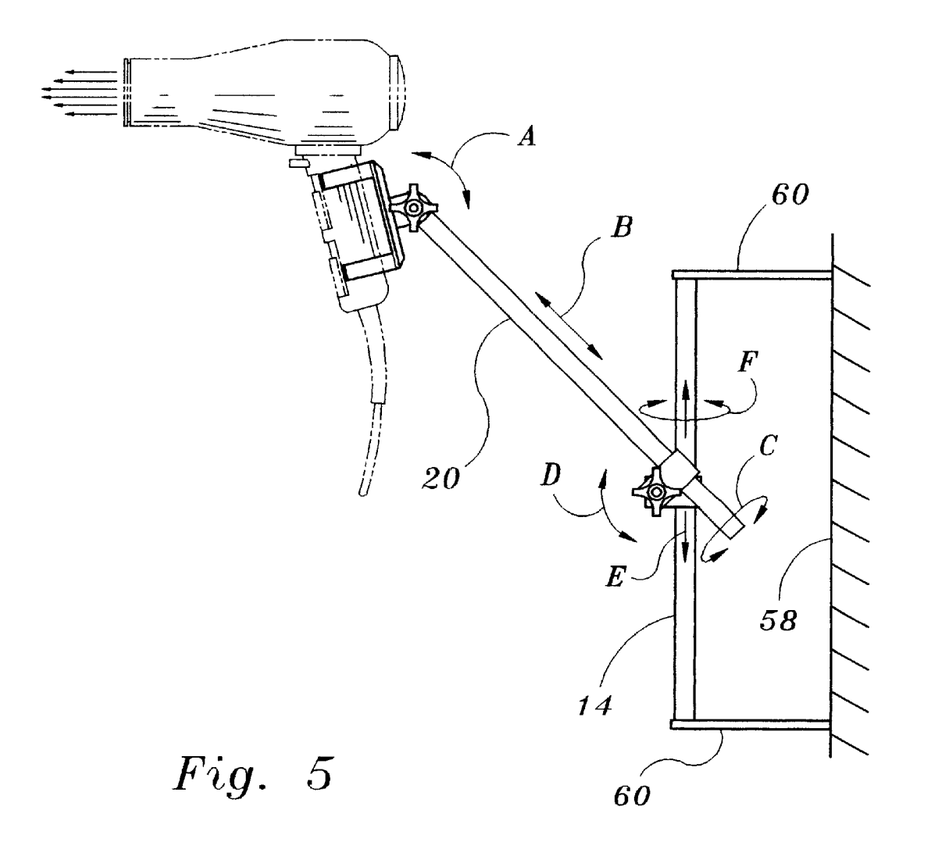
FIG. 5 is a side view of an accessory support device with a hair dryer with a permanent mount, the device produced in accordance as an alternative to the preferred embodiment of the present invention.

An alternative method of support is shown in FIG. 5. Here the base member 14 is mounted to a structure 58 by use of a pair of support arms 60. This could be the used in a hotel bathroom where a permanent structure is desired. The support arms are shown here to be rigidly attached to a structure 58, or wall. This may not always be the case in this form of the invention. The arms 60 could in fact pivot out from the wall or pull out on a linear track to make it less obtrusive when it is not in use. The degrees of freedom (A–F) are so marked to show how the versatility of the invention is not compromised in this sort of an arrangement. In addition, the base member 14 could also be positioned horizontally, like a towel rack. Then by making the cross-bore of the split collar parallel to the bore for the base member 14, the movement of the secondary member 20 would be the same as with a vertically positioned base member 14.

Figure 6:
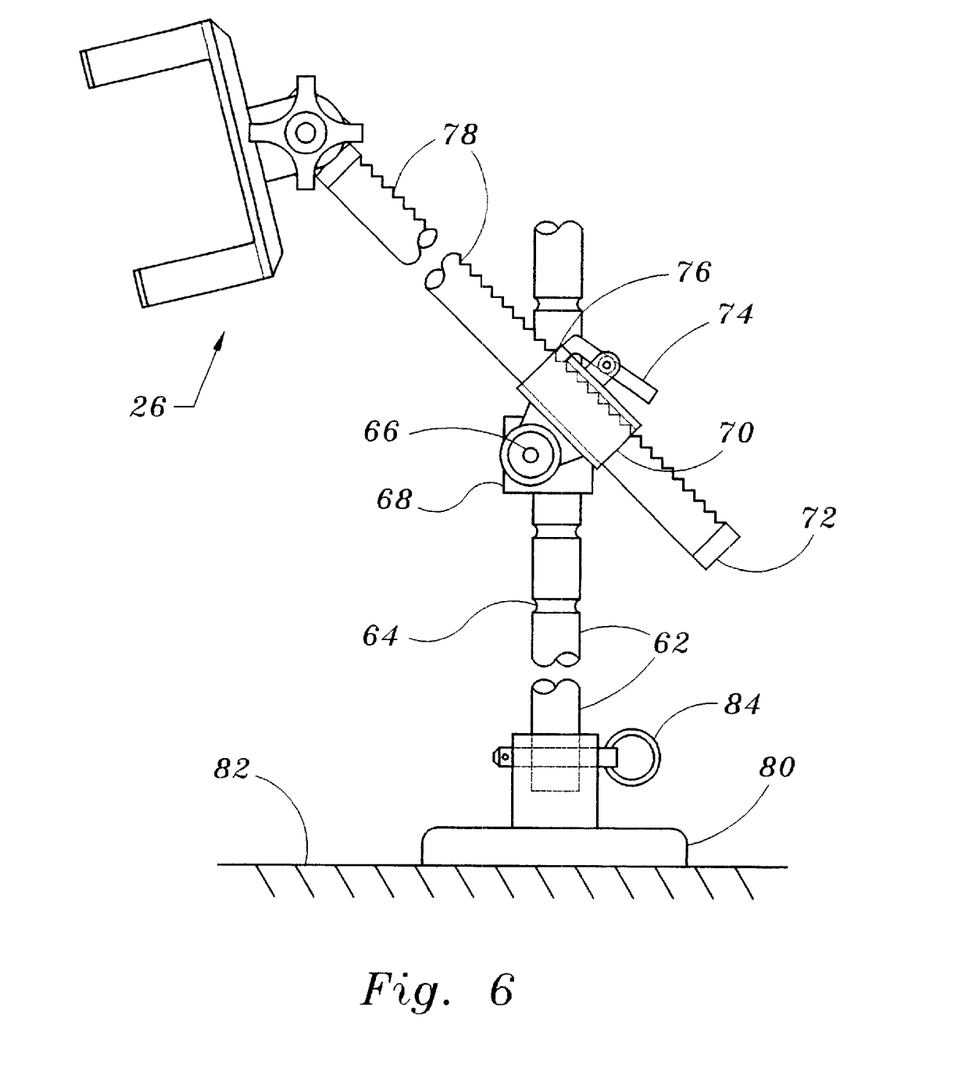
FIG. 6 is a side view of an accessory support device showing alternative forms of the base and secondary members, the device produced in accordance as an alternative to the preferred embodiment of the present invention.

Another alternative is shown in FIG. 6. Here a device with several variations to the previously disclosed is shown. First a notched base member 62 is used in place of a smooth cylindrical version. The notches 64 provide a set of undercuts that enable supporting a pin 66 and with it a sleeve 68 through which the pin 66 also penetrates. This combination is an alternative method of height adjustment for the sleeve 68. Attached to the sleeve 68 is a second sleeve 70. This second sleeve 70 is adapted to receive a notched bar 72 which acts as the secondary member as previously disclosed. A spring loaded lever 74 is attached to the second sleeve 70 and a tip 76 articulates with the notches 78 of the notched bar 72. This acts as a ratcheting lock for adjustment of the mounting clamp 26, which as previously disclosed, supports the dryer or other item. The use of the notched bar 72 precludes the bar 72 from rotating within the second sleeve 70. This eliminates one of the degrees of freedom of the previous disclosure, degree of freedom "C". The inventions would still be viable without this degree of freedom. An infinite number of manufactured methods could be used to perform this function.

A final variation as shown in this figure is the method of mounting. Here a mounting plate 80 is used to mount the invention to the supportive surface 82. Traditional fasteners, chemical adhesives, or any other form of fastening can be used in this application. The notched base member 62 is mounted to the mounting plate 80, by use of a pin 84. This allows the mounting plate 80 to be permanently mounted to the supportive surface 82 while the rest of the invention can be removed. Any other of a number of forms of attachment could be used in this application including threading the end of the notched base member 62 and the internal portion of the base plate 80.

Figure 7:
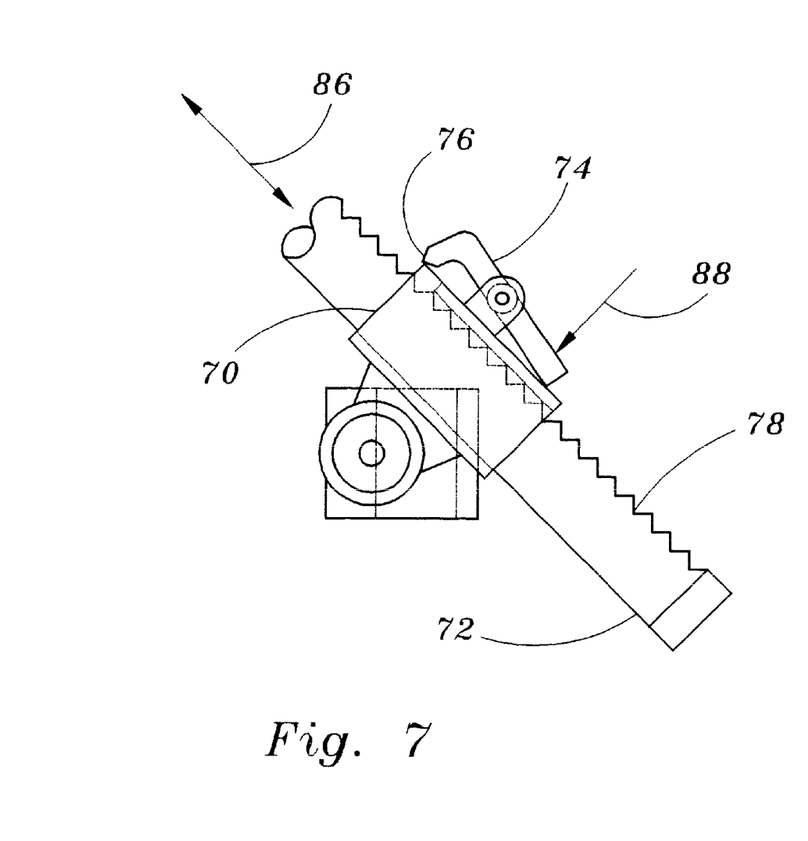
FIG. 7 is a side view of an alternative form of the secondary member of the accessory support device.

Further details of the second sleeve 70 are shown in FIG. 7. Here the movement of the notched bar 72, as depicted by the arrow 86 show that with the lever 74 depressed, from the force directed by the second arrow 88, the tip 76 is removed from the notches 78 of the notched bar 72. This allows the notched bar 72 to move freely within the second sleeve 70. If the notched bar 72 were to be pulled toward the upper right, as laid out here, the bar 72 would pull up, ratcheting up as it went. The bar 72 would not be able to move down except when the lever 74 is depressed, as shown in this figure. This quick adjustment can be an advantage and since the sacrifice of the degree of freedom is not critical to the function of the invention, this is an alternative locking method.

Figure 8:
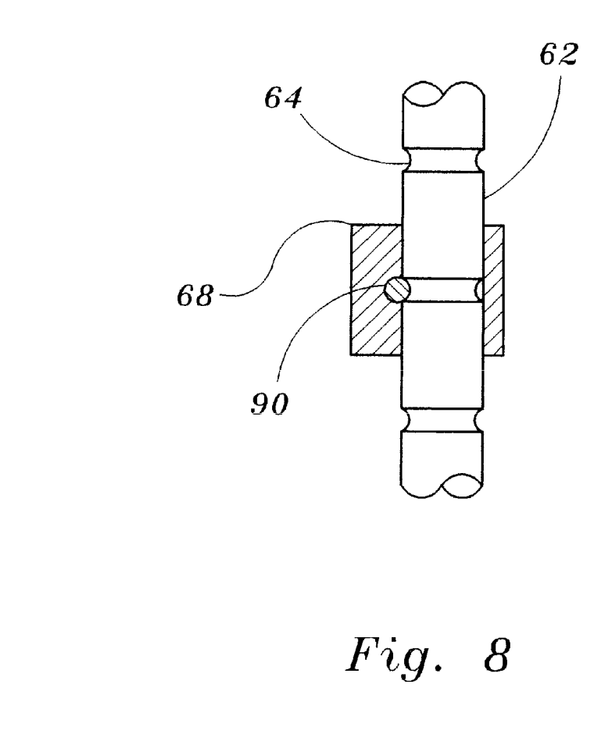
FIG. 8 is a side view of an alternative form of the base member of the accessory support device.

What is shown in FIG. 8 is a section of the sleeve 68, which is supported by the notched base member 62. This view shows how the shaft 90 of the pin 66 nests within the sleeve 68 and a notch 64 to lock one with the other. This does not restrict rotation of one part with respect to the other, as the previously disclosed clamping mechanism would when the parts are locked together. Either form would be functional and considered to fall within the scope of the disclosure of this invention.

It is to be understood that all of the enclosed information is presented as the preferred embodiment as seen by the inventor. An infinite number of variations and modifications can be made including the sizing and positioning of the detailed information and forms of graphics used to communicate information to the user.

What is claimed is:

1. An accessory holder comprising:
   a substantially longitudinal base member including a plurality of adjustment notches;
   a support device which enables support of said base member on a structure;
   a positioning support, adapted to receive said base member and enabling both linear and rotary movement thereon;
   a substantially longitudinal secondary member, received by said positioning support and enabling linear movement thereon, and
   a mounting clamp pivotally attached to said secondary member.

2. An accessory holder as described in claim 1, wherein said support device is comprised of a suction cup on a distal portion of said base member.

3. An accessory holder as described in claim 1, wherein said support device is comprised of a rigid mounting fixture.

4. An accessory holder as described in claim 3, wherein said rigid mounting fixture is comprised of a mounting plate.

5. An accessory holder as described in claim 3, wherein said rigid mounting fixture is comprised of support arms that are secured to said structure.

6. An accessory holder as described in claim 1, wherein said base member is cylindrical in shape.

7. An accessory holder as described in claim 1, wherein said secondary member is cylindrical in shape.

8. An accessory holder as described in claim 1, wherein said secondary member includes a plurality of locking teeth.

9. The device as described in claim 1, wherein said positioning support is comprised of two sleeves, each with a locking pin.

10. The device as described in claim 9, wherein said two sleeves are comprised of a pair of split collars.

11. An accessory holder as described in claim 10, wherein one of said split collars supports said secondary member, thereby enabling rotary movement of said secondary member within said split collar.

12. An accessory holder as described in claim 10, wherein said locking pin is further comprised of a threaded fastener.

13. An accessory holder as described in claim 9, wherein said locking pin includes a grip knob, thus enabling hand adjustment.

14. An accessory holder as described in claim 1, wherein said mounting clamp is of a type that includes an open end.

15. An accessory holder as described in claim 1, wherein said mounting clamp is positioned on a distal end of said secondary member.

16. An accessory holder as described in claim 1, wherein an accessory includes a device selected from the group consisting of a hair dryer, a mirror, a flashlight and hand tools.

17. A method of supporting an item including the steps of:
   providing a base member with adjustment notches that is supported by a structure;
   providing a positioning support that is adapted to receive said base member and engage at least one of said adjustment notches;
   providing a substantially longitudinal secondary member that is received by said positioning support, enabling linear movement thereon;
   providing a mounting clamp that is pivotally attached to said secondary member;
   adjusting said mounting clamp into a desired position by movement provided by said positioning support;
   positioning said item in said mounting clamp, thereby allowing support of said item.

18. The method as described in claim 17, wherein the step of providing a substantially longitudinal secondary member further comprises enables both linear and rotary movement thereon.

19. The method as described in claim 17, wherein said step of positioning said item in said mounting clamp further comprises using a mounting clamp with an open end.

* * * * *